United States Patent [19]
Welborn

[11] Patent Number: 5,768,869
[45] Date of Patent: Jun. 23, 1998

[54] OKRA POD HARVESTER AND CUTTER

[76] Inventor: Woodrow W. Welborn, 1606 Sharon-Sandersville Rd., Laurel, Miss. 39440

[21] Appl. No.: 788,714

[22] Filed: Jan. 23, 1997

Related U.S. Application Data

[63] Continuation-in-part of Ser. No. 589,936, Jan. 23, 1996, abandoned.

[51] Int. Cl.[6] .................................................. A01D 1/00
[52] U.S. Cl. .............................. 56/327.1; 56/239; 47/1.01
[58] Field of Search ................................. 56/327.1, 239, 56/339, 333; 47/1 B, 1 M, 1.01

[56] References Cited

U.S. PATENT DOCUMENTS

| 5,463,859 | 11/1995 | Perry | 56/339 X |
| 5,467,589 | 11/1995 | Lambert | 56/327.1 |

FOREIGN PATENT DOCUMENTS

| 2603182 | 3/1988 | France | 47/1 B |
| 1653614 | 6/1991 | U.S.S.R. | 56/333 |

*Primary Examiner*—Terry Lee Melius
*Attorney, Agent, or Firm*—Edwin E. Greigg; Ronald E. Greigg

[57] ABSTRACT

An okra pod harvester and cutter which is of a piece of material bent to form two arms with their ends spaced from each other. One arm has a portion bent at a 90° angle which is formed with a V-shape cut out and a cutting blade is secured across the V-shape cut out and held in place. The other arm is cut across its end at a 90° angle and has a length such that when the two arms are pressed toward each other, the one arm passes close within the bent end portion and passes the position of the cutter. As the one arm passes the bent end portion an okra pod placed in the V-shaped end of the bent portion is cut from the bush and is held between the two arms until the cut okra pod is placed into a container.

9 Claims, 1 Drawing Sheet

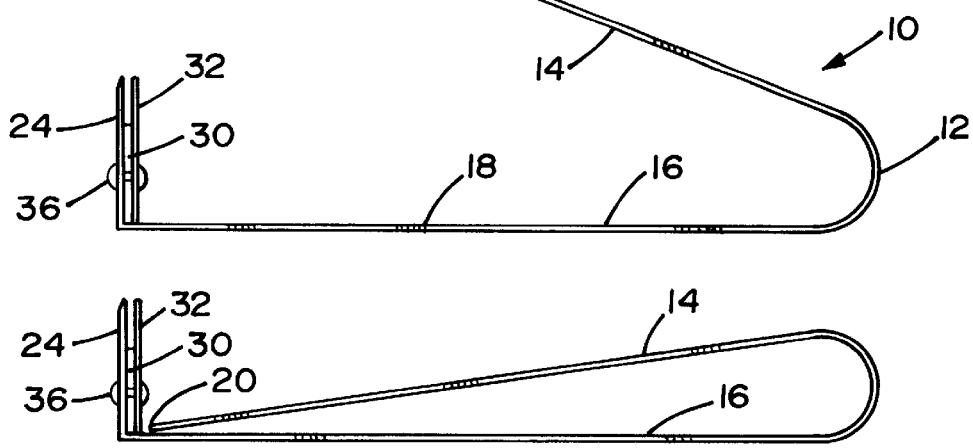
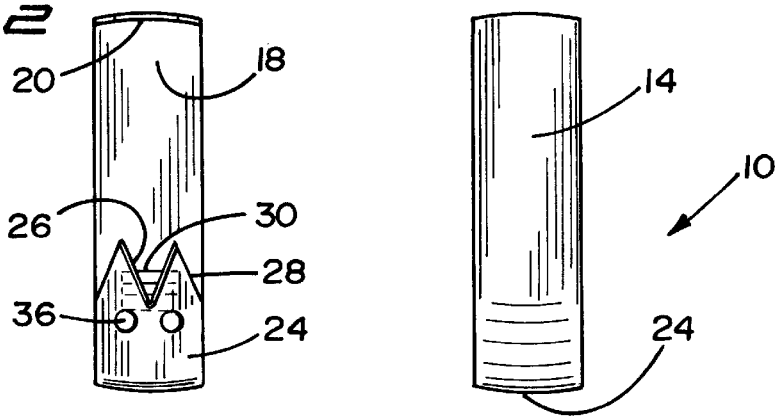
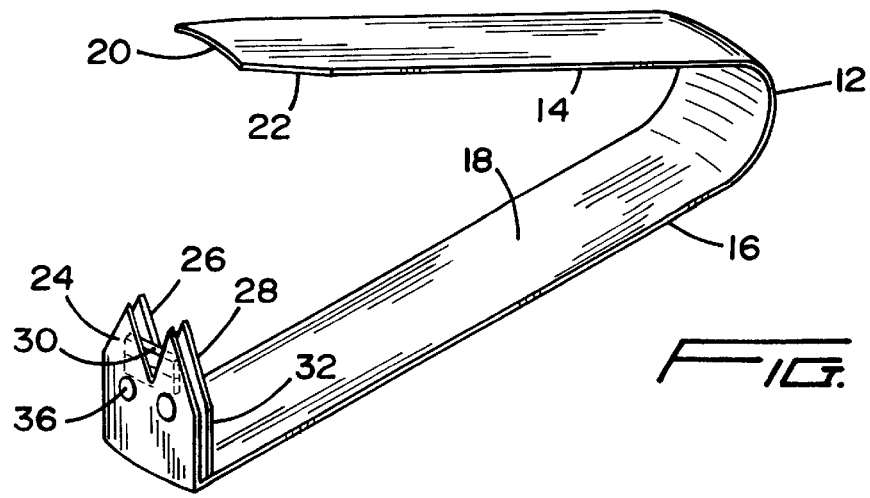

OKRA POD HARVESTER AND CUTTER

RELATION TO ANOTHER APPLICATION

This application is a continuation-in-part of U.S. Ser. No. 08/589,936 filed Jan. 23, 1996, now abandoned.

BACKGROUND OF THE INVENTION

This invention is directed to an improved okra harvester and cutter which permits one to harvest okra pods from a plant without touching the pod.

It is well known that okra plants grow pods which are harvested for consumption as a food product. Heretofore, okra pods have been harvested by holding the pod in one hand and cutting the pod from the plant with the other hand using a cutting tool. The pods have an almost hair-like, prickly surface exposure to which is uncomfortable to the hands of the harvester. In extreme cases, persons with sensitive skin have developed sores or allergic reactions after a prolonged period of exposure to the pods during a harvest.

A search of the prior art has been made and the following U.S. Pat. Nos. of interest were found: 235,678; 627,758; 878,545; 961,110; 1,009,342; 1,490,459; 1,685,977; and 3,050,853. The patents relate to different types of cutters and are not used for harvesting a food product.

OBJECT AND SUMMARY OF THE INVENTION

It is therefore a principal object of this invention to provide a simple, inexpensive tool by which okra can be harvested without touching the okra pod.

Another object is to provide an okra harvesting tool which not only cuts the okra pod from the plant but also holds the okra pod to allow for depositing each cut pod into a container in order to transport the okra pods to a processing station.

Another object is to provide an okra pod harvester which can also be used to cut the okra into small pieces.

Yet another object is to provide an okra pod harvester which avoids all need for handling the okra pod by touching the pod.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 illustrates a side view of the harvester-cutter;

FIG. 2 illustrates the harvester-cutter in a position subsequent to cutting an okra pod;

FIG. 3 illustrates an end view of the harvester-cutter shown in FIG. 1;

FIG. 4 is an end view of the harvester-cutter shown in FIG. 2; and

FIG. 5 is a perspective view of the harvester-cutter.

DETAILED DESCRIPTION OF THE HARVESTER-CUTTER

Now referring to the drawing there is shown a one piece harvester-cutter made of a resilient material, such as a spring steel-strip 10, which is bent at about the mid section to form a somewhat semi-circular closed end 12 with two extending arms 14 and 16. The spring steel strip 10 is somewhat concave along its inner surface 18 and the arm 14 is of one continuous straight section with end 20 which is cut at a 90° angle to form a straight end. The end is cut along each side 22 at an angle so that the width of the end is less than that of the arm 14. The arm 16 has substantially the same length as that of arm 14 and is provided with a right angle end section 24 which is just to the outside of the straight end 20 of arm 14 when the two arms are pressed together. The end 24 of arm 16 has a central V-shaped notch cut-out 26, with each side 28 cut at an angle toward the V-shaped notch cut-out which forms a cutter end surface.

The end 24 is provided with a replaceable type cutter element 30 which extends across the V-shaped notch with a cutting edge of the blade parallel with the surface of arm 16. The cutter element is held in place by a backing plate 32 having the same shape and V-shaped notch 34 as that of the end 24. The backing plate 32 is held in place by screws, bolts, rivets 36 or any other suitable means, or by being integrally formed in said end. The preferred means is one by which the cutter could be easily removed for replacement.

Each arm of the harvester-cutter has a sufficient length that the device will cut an okra pod from the plant and will hold the cut okra pod between the two arms so that the okra pod can be dropped into a bag for that purpose. Not only is the harvester cutter used for harvesting the okra pods but also it can be used to cut the okra pod into smaller pieces if desired. Similarly, a flower could be cut from a bush, such as a rose from a thorny rose stem.

As an example, the spring steel is about 1¼ inches in width and about 20 inches in length before it is formed into a U-shape and the cutter end 24 formed. The length of the cutter end is about 1¾ inches. The sizes set forth are only illustrative and not restrictive since the arms could be shorter or longer, wider or narrower and can be made of any suitable material that has resiliency, memory and yet sufficient hardness to sever a stem of a pod, such as certain metals or plastics.

In use, the harvester cutter is held in one hand. The stem of the okra pod or flower is placed into the V-shaped notch end with the pod or flower extending to the inside of the harvester-cutter. The upper arm 14 is forced toward the lower arm 16 and as the upper arm forces the okra pod or flower toward the inner surface of the arm 16, the okra pod or flower is cut, held between the two arms as if by tweezers, and then dropped into the harvest bag for transport back to the packing or shipping station. Obviously, the arm 14 must be able to pass beyond the screws 36 that secures the cutter and backing plate in place.

The device has been described as used for cutting an okra pod or flower from a plant. It can also be used for cutting other types of vegetables from the plant such as green beans (pole or bush) as well as for harvesting figs or cut flowers particularly a rose which has thorny stems. Thus, the device is not limited to harvesting okra pods and flowers.

The structure of the V-shaped notch is such that the device could be used to cut the okra or beans into smaller pieces in which the smaller pieces need not be held between the arms of the device subsequent to cutting in small pieces.

The device can be operated by one hand by pressing the upper arm 14 with the thumb while holding arm 16 between the palm and the fingers of the hand.

The foregoing relates to preferred exemplary embodiments of the invention, it being understood that other variants and embodiments thereof are possible within the spirit and scope of the invention, the latter being defined by the appended claims.

What is claimed:

1. A harvester-cutter which includes a substantially U-shaped device made of a spring type material, said U-shaped device including first and second arms (14, 16) extending from a closed end (12) with said first and second arms spaced from each other in a spring-relaxed position, said first arm (14) having a longitudinal extent terminating in means defining a first end, said second arm (16) having a longitudinal extent terminating in means defining a second end, said second end being bent at about 90° to a length of said arm, and toward the first arm, said bent end including a V-shaped notch (26) therein, a backing plate (32) secured to said bent end of said second arm, a cutter blade (30) secured between said bent end of said second arm and said backing plate with the cutter blade held in place by a suitable means with the cutter blade extending across said V-shaped notch of said bent end, whereby the first end of the first arm is movable toward said second arm, inwardly of said bent end and in close proximity thereto as the first arm is pressed toward said second arm during a cutting operation.

2. A harvester-cutter as set forth in claim 1, wherein said U-shaped device is made of a flat resilient metallic material.

3. A harvester-cutter as set forth in claim 1, wherein said U-shaped device is made of a flat resilient plastic material.

4. A harvester-cutter as set forth in claim 1, wherein said backing plate includes a complementally formed V-shaped notch to that in said bent end.

5. A harvester-cutter as set forth in claim 4, wherein said cutter blade is disposed so as to extend across both said V-shaped notches.

6. A harvester-cutter as set forth in claim 1, wherein said cutter element is held between said bent end and said backing plate by screws.

7. A harvester-cutter as set forth in claim 1, wherein said cutter element is held between said bent end and said backing plate by a friction fit.

8. A harvester-cutter as set forth in claim 1, wherein said second end is offset at an angle to a longitudinal axis of said second arm, whereby plant material to be cut can be approached from one side.

9. A harvester-cutter as set forth in claim 8, wherein said first end is formed at a complemental angle to that of said second end to allow for more effective cutting and grasping of plant material.

* * * * *